Figure 11:
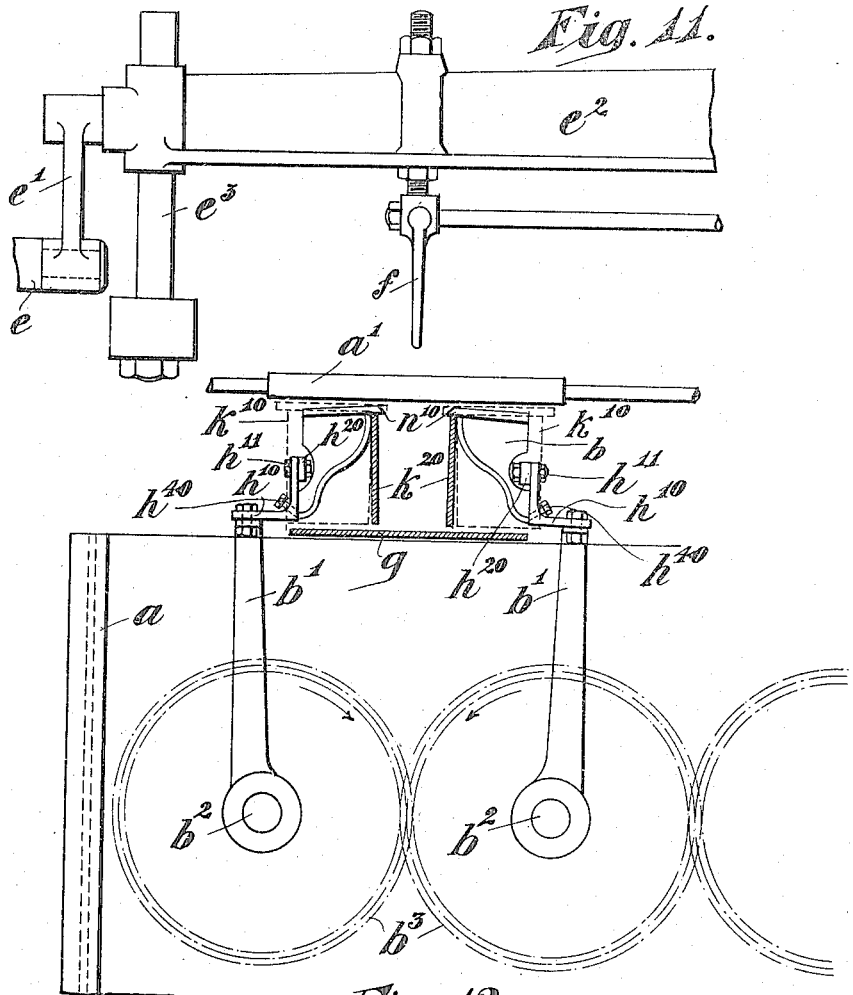

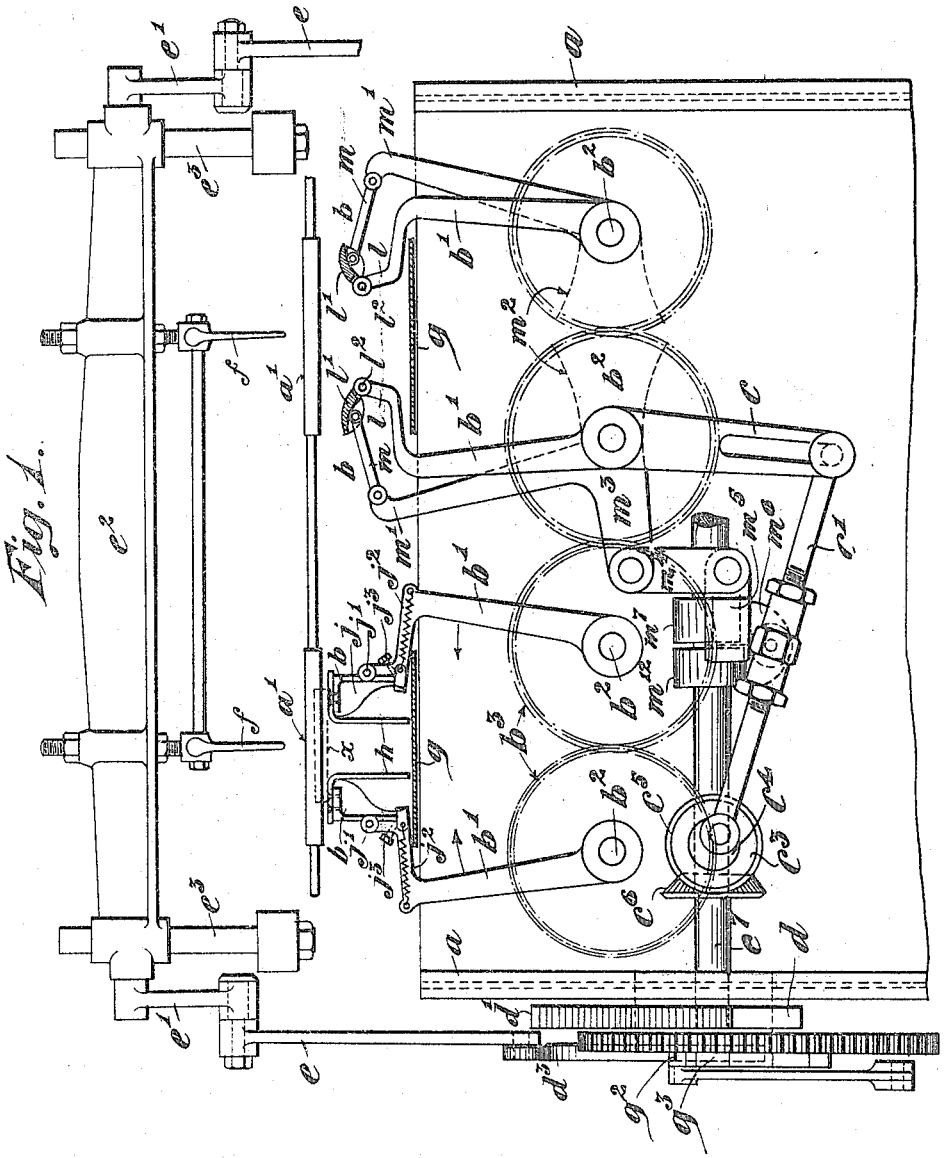

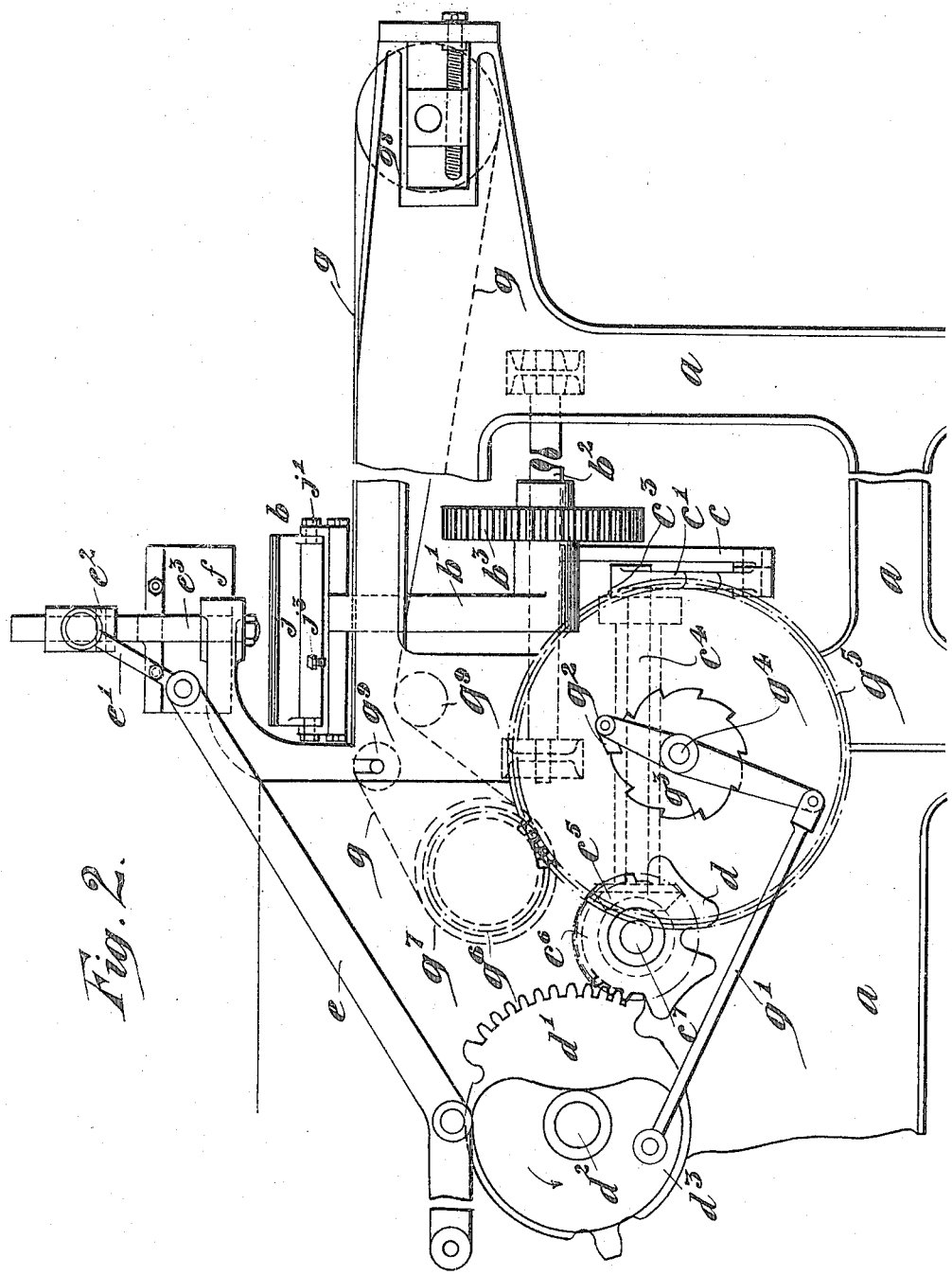

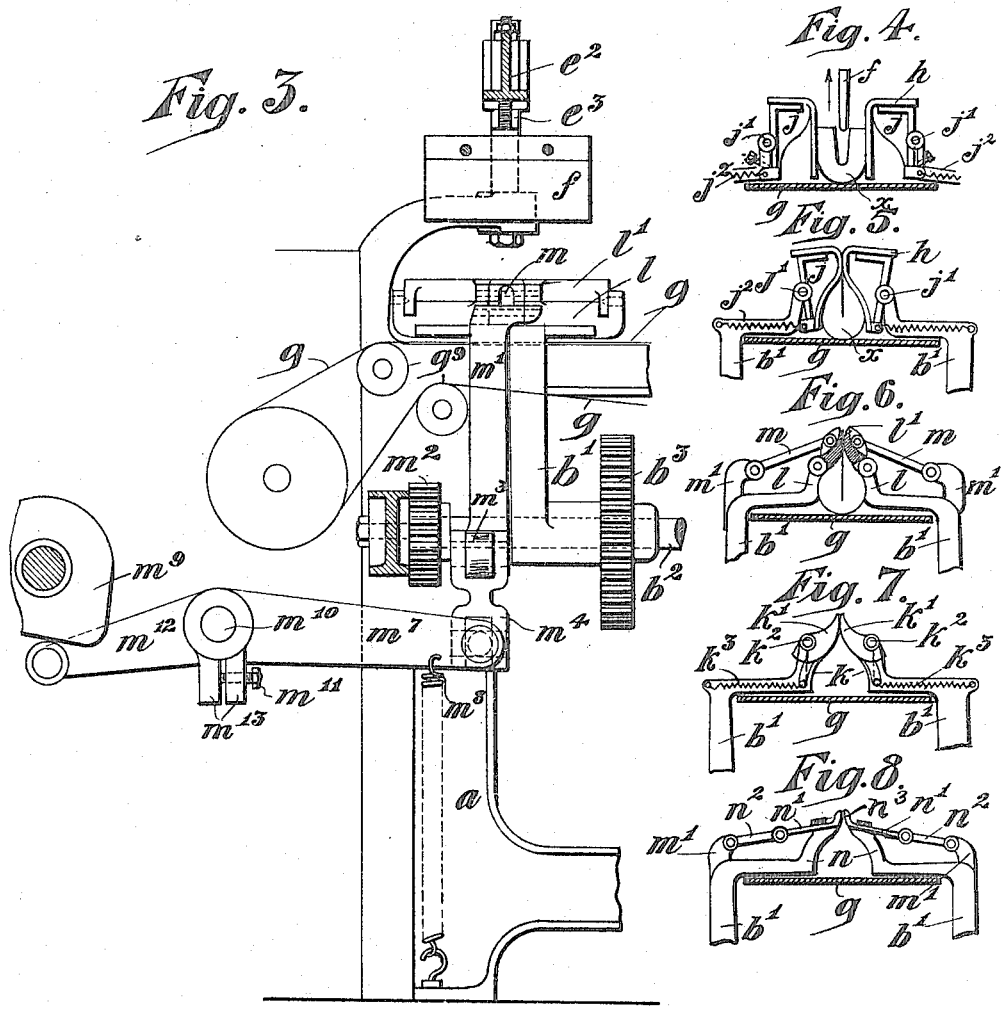

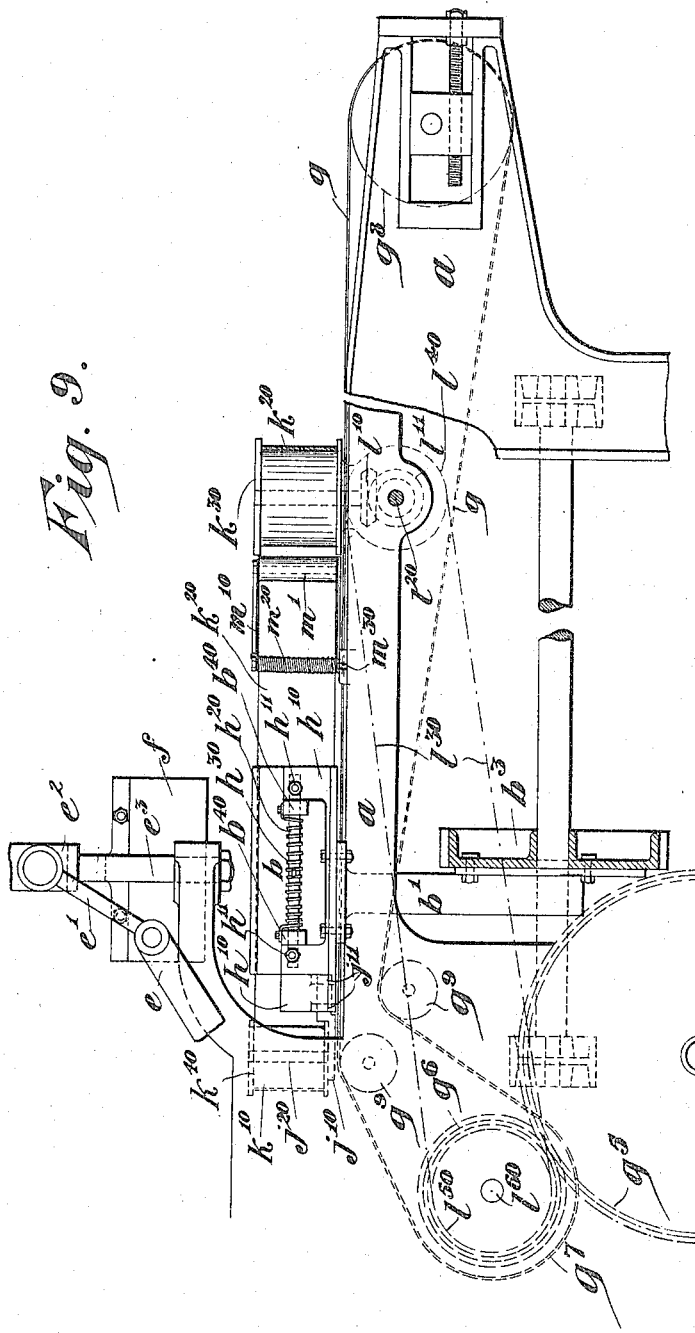

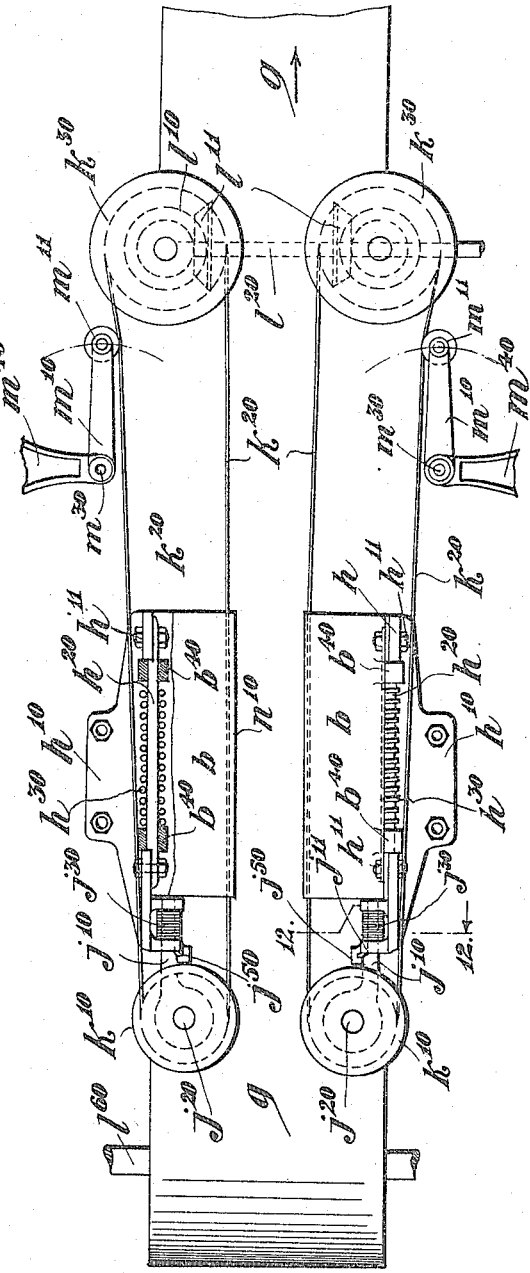

G. S. & G. R. BAKER.
MOLDING OR SHAPING DOUGH.
APPLICATION FILED SEPT. 5, 1914.

1,202,350.

Patented Oct. 24, 1916.
6 SHEETS—SHEET 6.

WITNESSES.

INVENTORS
GEORGE SAMUEL BAKER AND GEORGE RALPH BAKER.
by
Attorney

UNITED STATES PATENT OFFICE.

GEORGE SAMUEL BAKER AND GEORGE RALPH BAKER, OF LONDON, ENGLAND.

MOLDING OR SHAPING DOUGH.

1,202,350.

Specification of Letters Patent.

Patented Oct. 24, 1916.

Application filed September 5, 1914. Serial No. 860,438.

*To all whom it may concern:*

Be it known that we, GEORGE SAMUEL BAKER and GEORGE RALPH BAKER, subjects of the King of England, residing at Willesden Junction, London, N. W., in England, have invented certain new and useful Improvements in the Molding or Shaping of Dough, of which the following is a specification.

This invention relates to the molding or shaping of dough and while generally applicable to such operations is particularly adapted for use with the apparatus disclosed in the specification of our prior application for Letters Patent, Serial No. 774,830, filed 20 June 1913, which discloses mechanism for producing the initial folds in dough for the production of a Scotch or square loaf or the like.

In the prior specification the forward portion of a sheet of dough is laterally engaged by a folding member, an intermediate portion of said sheet being then deposited by gravity onto a support, the final portion of the sheet also deposited by gravity onto said intermediate or final portion, and the initial portion finally brought back onto said first or final portion.

Now the present invention comprises means for forming a fold in a sheet of dough for example the final fold of a sheet previously dealt with as above mentioned or otherwise, for instance to produce the finished Scotch or square loaf, this fold being a single one at or about the center of the dough and taking place preferably at right angles to the preceding fold or folds, where such have been produced.

To this end the invention broadly stated consists in positioning the dough in relation to a pair of separated folding members, forcing the dough between said members to form a single fold and then bringing said members together or toward one another to compact the dough therebetween. In practice the dough may be positioned above the folding members which are separated for a distance sufficient to permit the dough to pass therebetween, the central portion of the dough being then subjected to a reciprocating element which presses the dough between said members in a U-shaped fold and then is withdrawn, and finally the two folding members are brought toward one another to squeeze together the two thicknesses of dough produced by the action of the reciprocating element. The cross section of the finished product is somewhat of a bulbous shape with the edges of the dough pressed firmly together.

In some instances, as for example when treating certain kinds of dough, it has been found desirable to provide positive means for removing the folded dough from between the folding members and to this end the present invention further comprises means for assisting the delivery of the folded dough by frictional pressure exerted on opposite sides thereof, such delivery means being, for example, in the form of a pair of delivery belts and passing over the pressing faces of said folding members, said belts being intermittently driven and being adapted to grip the folded dough between them to remove same from the folding members while being supported below on a conveyer.

Figure 12:
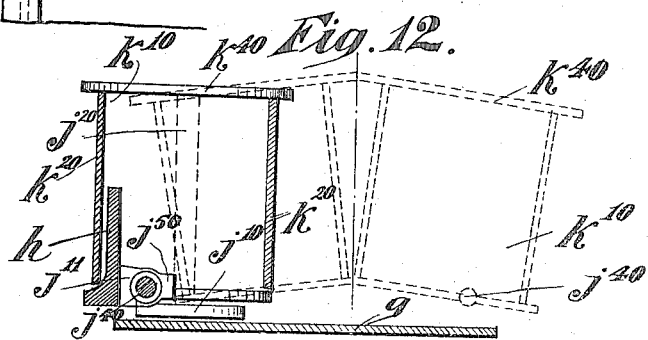

Embodiments of the invention are represented in the accompanying drawings in which, Figure 1 is a front or end elevation partly in section of apparatus suitable for carrying out the invention, two alternative forms of folding members being shown in this figure; Fig. 2 is a side elevation showing the operating means for the various elements and for one pair of said folding members. Fig. 3 is a partial side elevation showing the operating means for the other of said pairs of folding members; Figs. 4 and 5 are front views of a pair of folding members showing the dough between same in partially and completely folded condition respectively; Figs. 6, 7 and 8 views similar to Fig. 5 of modified or alternative forms of folding members; Fig. 9 is a side elevation partly in section showing the positive delivery means; Fig. 10 is a plan view of the folding members, delivery belts, and appurtenant parts with parts in section; Fig. 11 is a partial front elevation of Fig. 9 with parts in section, and Fig. 12 is a detail view in section on line 12—12 of Fig. 10, of one of the pulleys on which a delivery belt is mounted.

Referring more particularly to Figs. 1 and 2, in which Fig. 1 shows a duplex machine, $a$ designates the framing above which extends a web $a^1$ by which a sheet of dough previously given the initial folds and indicated by the reference $x$ in Fig. 1 is fed to a position above the folding members $b$ while the latter are in separated position. These folding members are operated by levers $b^1$ mounted on shafts $b^2$ and integral with intermeshing gears or segments $b^3$ so that they operate in unison, one of said levers being rocked by means of an arm $c$ connected by an adjustable rod $c^1$ to a crank or eccentric $c^3$ on a shaft $c^4$ driven by bevel gearing $c^5$, $c^6$, the latter on a shaft $c^7$. This shaft carries one element of an interrupted gearing comprising a stop wheel $d$ which meshes with a partially toothed wheel $d^1$ carried by a shaft $d^2$ on which is also mounted a cam $d^3$ adapted to actuate a pivoted rod $e$ connected by a link $e^1$ to a cross head $e^2$ disposed above the web $a^1$ and guided, for vertical reciprocation on pillars $e^3$, the cross head being actuated in a similar manner at both sides of the machine. In the said cross head is adjustably mounted a "basher" $f$ for depressing the central portion of the dough between the folding members $b$ so that the base of said dough is forced upon a traveling web $g$ which is given intermittent travel from the cam $d^3$ by means of connecting rod $g^1$ and pawl and ratchet gears $g^2$ $g^3$, the ratchet wheel of which is mounted on a shaft $g^4$ which carries a gear wheel $g^5$ meshing with a pinion $g^6$ rotating with a pulley $g^7$ which drives the web, the latter being supported at its other end by a pulley $g^8$ and passing over suitable guide rollers $g^9$.

The mechanism above described permits of the following operations being performed: While the web $g$ remains stationary, the dough $x$ is delivered above the folding members when at rest in their intermediate or receiving position shown in Fig. 1, whereupon the basher $f$ descends and folds the dough centrally into U-form between said members, as shown in Fig. 4. The basher then withdraws, and the folding members are brought toward one another to fold the dough into a form substantially as shown in Fig. 5, this being followed by a short period of rest of said members, whereupon said members are given an outward movement to their original receiving position to release the dough; and the web $g$ is now caused to advance to withdraw the dough from between the folding members, these operations being repeated for each piece of dough fed to the folding members.

As shown at the left hand side of Fig. 1 the folding members may be provided with flexible depending coverings $h$ of rubber or the like having an outer coating of fluffy textile material known as "swansdown" or other material suitable for contact with the dough which will prevent sticking thereof and when the folding members are brought together as above described to compact the dough firmly in the space between them the said coverings conform to the shape of the folding members as shown in Fig. 5, but during the time that the U-shaped piece of dough rests between the folders before and while the basher is withdrawn these flexible coverings support the sides of the fold and prevent the dough from dipping down into the cavity between the folders (Fig. 4).

Various forms of folding members may be adopted for producing the desired result, and as one example shown at the left hand side of Fig. 1, we use a pair of blocks $j$ pivoted at $j^1$ to their supports (viz. the levers $b^1$ which have angular upper ends) about midway of their height or width and under the action of springs $j^2$ connected to their tails and to the levers in such a manner that when the members are brought toward one another, those portions which squeeze the edges of the dough are allowed to contact, which rocks the members about their pivots $j^1$ against the action of said springs (Fig. 5) and produces a slight upward drawing or stretching closing action of the members on the edges of the dough which in practice is highly desirable to completely close said edges. On separation of the members $j$ the springs return the same to normal position.

An adjusting screw $j^3$ may be provided to vary the angle of the block $j$ in relation to its support.

In a further form as shown in Fig. 7, the folding members may be each formed in two parts, one part $k$ rigid with its support or operating member, viz. the lever $b^1$ and the other part $k^1$, viz: that adjacent the edges of the dough, pivoted at $k^2$ to the rigid part, and under the action of a spring $k^3$ the action being substantially the same as in the form just above described.

In a further form as shown at the right hand side of Fig. 1 and in Fig. 6, each folding member is again made in two parts, one part $l$ being rigid and integral with the bent end of lever $b^1$, and the other part $l^1$ pivoted to the rigid part at $l^2$. Said pivoted portions are not, however, under spring action but are actuated positively and independently of the rigid portion to produce the drawing or stretching closing action required on the edges of the dough. With reference to this construction, reference is also directed to Fig. 3 from which, together with Fig. 1, it will be seen that the pivoted parts $l^1$ of the folding members are connected by links $m$ to further levers $m^1$ mounted on the shafts $b^2$ which carry intermeshing segments $m^2$ to produce movements of the parts $l^1$ in unison. One of said levers $m^1$ is cranked at $m^3$ and is connected by links $m^4$ and $m^5$ to a lever $m^7$, mounted on a shaft $m^{10}$ and under the action of a spring $m^8$; the shaft also carries another lever $m^{12}$ acted on by a cam $m^9$ to rock said lever with its shaft $m^{10}$ and consequently the lever $m^7$ and thus effect the independent movement of the parts $l^1$ to produce the closing motion of said parts on the dough as above explained. Adjustment of the levers $m^7$ $m^{12}$ on shaft $m^{10}$ to vary the throw of the parts $m$ may be effected by the screw $m^{11}$ coacting with lugs $m^{13}$ on the bosses of the levers. The parts $l^1$ of this form of folder are only used to pinch the edge of the dough to complete the fold, as shown in Fig. 6, and are at other times in the position shown at the right hand side of Fig. 1, but on closing may produce a certain amount of the drawing action obtained with the spring pressed members above described, by suitably shaping the cam $m^9$ and closing the lower rigid parts $l$ of the members after the pivoted parts $l^1$ have come together.

In a still further form shown in Fig. 8, the folding members comprise a rigid shaped body portion $n$ and an outer slide portion $n^1$ adapted to act only on the edges of the dough. The slides are given reciprocatory movement toward and away from each other independently of the body portion, for example by means such as described with reference to the construction at the right hand side of Fig. 1, being connected by links $n^2$ to the additional levers $m^1$, and are shaped as at $n^3$ and given an inclined path of movement to effect the required drawing or closing action on the edges of the dough to close same.

It will be understood that the flexible coverings $h$ may be used with any of the forms of folders described.

To now describe means for assisting the delivery of the folded dough, there is bolted or otherwise secured to each of the folder operating arms or levers $b^1$ a folder carrier $h^{10}$ formed of angle iron and secured to the front or adjacent face of each of said carriers as by bolts $h^{11}$ is a rod $h^{20}$ on which the folding member $b$ is pivoted as by means of lugs $b^{40}$. About said rod is disposed a helical spring $h^{30}$ tending to hold the folding member forced against the lower part of the front surface of the angular carrier $h^{10}$, the arresting position being adjustable as by means of a set screw $h^{40}$ passing through the carrier and abutting against the lower surface of the folding member.

On each of the carriers $h^{10}$ is mounted a swiveling bracket $j^{10}$ having a stem or extension carried in lugs $j^{11}$ of said carrier and supporting the pivot $j^{20}$ of the rear pulley $k^{10}$ for a delivery belt $k^{20}$. About that part of the bracket $j^{10}$ between the lugs $j^{11}$ is coiled a spring $j^{30}$ by which the upper ends of the pulleys are forced toward one another about the axes $j^{40}$, means for limiting this movement being provided shown as comprising a stop $j^{50}$ on one of the lugs $j^{11}$ against which a flattened face of the bracket $j^{10}$ bears. The said rear pulleys $k^{10}$ may thus rock so that the delivery belts $k^{20}$ can be caused to approximately follow the rocking movements of the folding members, the positions being shown in full and broken lines in Fig. 12 from which it will be seen that when the upper flanges $k^{40}$ of the pulleys contact with one another the pulleys will rock upward and backward at their upper parts in the same way as the folding members. It should be remarked that in this construction with the use of the delivery belts $k^{20}$ the flexible members $h$ above referred to need not be used.

The forward end of the delivery belt is carried and intermittently actuated by a pulley $k^{30}$ shown as driven by bevel gearing $l^{10}$, $l^{11}$, and a cross shaft $l^{20}$, this latter being operated as by chain $l^{30}$ and chain wheels $l^{40}$, $l^{50}$, the latter on the shaft $l^{60}$ of the lower delivery conveyer pulley $g^7$. The drive of the delivery belts is thus intermittent, said belts remaining stationary during the folding operation and then being moved to deliver the folded dough.

The tension of the delivery belts is maintained constant by rocking arms $m^{10}$ each carrying a roller $m^{11}$ bearing against the back of the belt and under the action of a spring $m^{20}$, the arms being mounted on spindles $m^{30}$ suitably carried as by brackets $m^{40}$ on the machine framing.

The upper surfaces of the folding members are preferably plain polished metal which offers a good surface onto which to feed the dough and from which it may be forced by the basher $f$ between said folding members. These latter are also preferably provided with an overhanging lip $n^{10}$ slightly deeper than the thickness of the delivery belts, so that the latter may pass under same and permit the dough to be forced downward between the folding members substantially without contact with the belts until it is in position to be folded.

The delivery belts may be made of flannel, canvas or other appropriate material.

We do not limit ourselves to the particular arrangement or combination of parts previously specified, since the actual construction of the folding members and the means for producing the desired movements thereof and of the "basher" and web in proper time relation may be varied without departing from the spirit of the invention.

What we claim as our invention and desire to secure by Letters Patent of the United States is:—

1. A machine for molding or shaping dough comprising a pair of folding members rectilinearly movable in a horizontal plane and operated in unison, and a reciprocating member movable rectangularly to said folding members and adapted to force the dough between said members in a substantially U-shaped fold.

2. A machine for molding or shaping dough comprising a pair of folding members rectilinearly movable in a horizontal plane and adapted to receive on their upper surfaces a sheet of dough to be folded, means for reciprocating said members away from and toward each other, and a vertically reciprocating member adapted to force the dough between said folding members in a substantially U-shaped fold when said folding members are separated, said folding members and reciprocating member acting on the dough at a single position of the latter.

3. A machine for molding or shaping dough comprising a pair of folding members rectilinearly movable in a horizontal plane and operable toward and away from each other in unison, a vertically reciprocating "basher" adapted to force the dough between said members in a substantially U-shaped fold, the folding members and basher operating on the dough at a single position of the latter, means for operating the basher while the folding members are separated and then withdrawing said basher, means for bringing the folding members toward one another to compress the dough and then causing said members to recede, a web adapted to support the dough during the action of the basher and folding members, means for holding the web stationary during the folding operations, and means for subsequently moving said web to withdraw the folded dough from between said folding members.

4. In a machine for molding or shaping dough, a pair of supports, a folding member mounted on each of said supports, means for reciprocating said supports away from each other and toward each other to an extent to permit contact of the upper edges of the folding members and means for insuring a movement of said members independently of their supports when the said edges contact with each other.

5. In a machine for molding or shaping dough, a pair of reciprocatable supports, a folding member pivoted to each of said supports, and a spring connected to each member, the edges of said members being adapted to come in contact during their reciprocation and be rocked about their pivots against the action of said springs.

6. In a machine for molding or shaping dough, a pair of reciprocatable supports, a folding member mounted on each of said supports and comprising two parts, one rigid with its support and the other pivoted to said rigid part, and a spring connected to each pivoted folding member part, the edges of said members being adapted to come in contact during their reciprocation and be rocked about said pivots against the action of said springs.

7. In a machine for molding or shaping dough, the combination of a pair of folding members adapted to receive the dough between, means for reciprocating said folding members toward and away from each other, and a flexible covering for each of said members adapted to laterally support the folded dough prior to and during the closing movement of said members.

8. In a machine for molding or shaping dough, the combination of a pair of folding members reciprocatable toward and away from each other, a reciprocating member adapted to force dough between said members in a substantially U-shaped fold, and means adapted to exert frictional pressure and traction on opposite sides of the folded dough to remove same from between said folding members.

9. In a machine for molding or shaping dough, the combination of a pair of folding members reciprocatable toward and away from each other and adapted to receive and fold the dough between them, a reciprocating member adapted to force the dough between said members in a substantially U-shaped fold and a delivery belt passing over the receiving face of each folding member, and movable relatively to the latter to remove the folded dough from between said members.

10. In a machine for folding or shaping dough, the combination of a pair of rocking folding members reciprocatable toward and away from each other and adapted to receive and fold the dough between them, and a delivery belt passing over the receiving face of each folding member and movable relatively to the latter to remove the folded dough from between said members, said belts being each adapted to rock at one end to substantially follow the rocking movements of said folding members.

In witness whereof we have signed this specification in the presence of two witnesses.

GEORGE SAMUEL BAKER.
GEORGE RALPH BAKER.

Witnesses:
  CARL R. LOOP,
  O. J. WORTH.